(12) United States Patent
Adde et al.

(10) Patent No.: US 6,338,578 B1
(45) Date of Patent: Jan. 15, 2002

(54) RETAINING ARRANGEMENT FOR A BEARING, IN PARTICULAR FOR A HIGH PRESSURE COMPRESSOR SHAFT

(75) Inventors: Danielle Christiane Roberte Adde, Cesson; Jean-Louis Bertrand, Livry/Seine; Gérard Jean Lavigne, Arbonne; Olivier Richard Lefebvre, Melun, all of (FR)

(73) Assignee: Societe Nationale d'etude et de Construction de Moteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/554,516
(22) PCT Filed: Sep. 16, 1999
(86) PCT No.: PCT/FR99/02204
§ 371 Date: May 17, 2000
§ 102(e) Date: May 17, 2000
(87) PCT Pub. No.: WO00/17533
PCT Pub. Date: Mar. 30, 2000

(30) Foreign Application Priority Data

Sep. 17, 1998 (FR) .............................................. 98 11604

(51) Int. Cl.$^7$ ............................. F16C 33/64; F01D 5/00
(52) U.S. Cl. ....................... 384/540; 384/537; 384/906; 415/170.1
(58) Field of Search ................................ 384/537, 539, 384/540, 584, 585, 906; 415/170.1, 110, 142

(56) References Cited

U.S. PATENT DOCUMENTS

| | | | | |
|---|---|---|---|---|
| 4,201,426 A | * | 5/1980 | Garten et al. ................ | 384/563 |
| 4,531,847 A | * | 7/1985 | F'Geppert ................ | 384/540 X |
| 4,973,221 A | * | 11/1990 | Anderson et al. ........... | 415/119 |
| 5,415,478 A | * | 5/1995 | Matthews et al. .......... | 384/476 |

FOREIGN PATENT DOCUMENTS

| | | | |
|---|---|---|---|
| EP | 0359659 A | * | 3/1990 |
| FR | 2424413 A | * | 11/1979 |

* cited by examiner

Primary Examiner—Thomas R. Hannon
(74) Attorney, Agent, or Firm—Oblon, Spivak, McClelland, Maier & Neustadt, P.C.

(57) ABSTRACT

A retaining arrangement is provided for retaining a bearing around a stub shaft having a machined cavity and which includes a ring forming a stop for the bearing nut and a locking piece.

7 Claims, 5 Drawing Sheets

RETAINING ARRANGEMENT FOR A BEARING, IN PARTICULAR FOR A HIGH PRESSURE COMPRESSOR SHAFT

TECHNICAL FIELD

Described is an arrangement for retaining a bearing, designed in particular to support a high-pressure compressor shaft, without this application be restrictive.

BACKGROUND ART

The construction of turbomachines demands complicated layouts because of the nesting of the high-pressure compressor and turbine stage inside the low-pressure turbine and compressor stage and because of the presence of two concentric runs of shafts each of which connects the compressor of one stage to the corresponding turbine. This complication is encountered above all during machine maintenance, when the machine has to be disassembled then reassembled.

A particular problem arises in the case of the high-pressure compressor. If we examine FIG. 1, which depicts an aircraft engine in longitudinal section, a rotor 1 is engaged in the center of a stator 2 and conventionally comprises a fan 3, a low-pressure compressor 4, a high-pressure compressor 5, a high-pressure turbine 6 and a low-pressure turbine 7 which are aligned from front to rear. All of these elements carry blades which alternate with stationary vanes of the stator 2 and, like those, are located in an annular stream 8 through which the gases flow; a combustion chamber 9 is arranged in the annular stream 8 between the high-pressure turbine 6 and compressor 5, and allows the fuel injected further upstream in the stream 8 to be burnt and thus produce combustion gases which drive the turbines 6 and 7. There is also a run of high-pressure shafts 10 connecting the high-pressure compressor 5 to the high-pressure turbine 6 and a run of low-pressure shafts 11 extending into a cavity 12 of the previous run of shafts 10 and which connects the low-pressure compressor 4 to the low-pressure turbine 7.

The high-pressure run of shafts 10 comprises, in particular, a high-pressure compressor stub shaft 13 around which is engaged a bearing 14 which supports it via a rib 15 belonging to the stator 2. Referring to FIG. 2 now for a more detailed examination, it can be seen that the bearing 14 is a rolling bearing, the inner ring 16 of which is slipped around the stub shaft 13 and held in place by a stop ring 17, it too being slipped around the stub shaft 13 from its end face 18 and which presses the inner ring 16 backwards, against an opposed stop ring 19 which touches a step 20 of the stub shaft 13. The inner ring 16 is kept clamped between the stop rings 17 and 19 by a nut 21 which, on its interior face, has a screw thread 22 engaged in a screw thread 23 made on the stub shaft 13 near the end face 18: by tightening the nut 21, the stop ring 17, the inner ring 16 and the opposite stop ring 19 are pushed back in turn before this stack of components is compressed against the step 20. The arrangement is supplemented by a locking piece 24, the purpose of which is to prevent the nut 21 from working loose as a result of vibration; this locking piece 24 is engaged in the cavity 12 and held in place in the stub shaft 13 by a circle of splines 25 engaged in corresponding splines belonging to the stub shaft 13 and by curved-over ends 26 of flexible tabs 27 engaged in a groove 28 in the stub shaft 13. The first of these connecting means prevents the locking piece 24 from rotating and the second prevents its translational movement, with respect to the stub shaft 13. The flexible tabs 27 are further supplemented by engagement tongues 29, adjacent to the curved-over ends 26. However, the locking piece 24 also comprises a circle of teeth 30, protruding from the cavity 12 and which engage between complementary teeth 31, also arranged in a circle and produced on a portion 32 of the nut 21 which extends inwards, in front of the end face 18 of the stub shaft 13, which it covers. For the sake of preciseness, it is added that the teeth 30 are at the front of the locking piece 24, the flexible tabs 27 at the rear, and the curved-over ends 26 and the engagement tongues 29 at the rear of the tabs 27.

To remove the high-pressure compressor 5 to which the stub shaft 13 belongs, this shaft needs to be disengaged from the bearing 14. A preliminary step consists of removing the low-pressure turbine 7 so that a high-pressure turbine shaft 33 which belongs to the line of low-pressure shafts 11 and occupies most of the cavity 12 can be extracted, by pulling it backwards. An appropriate tool with claws is then inserted around the engagement tongues 29 to press against them and push them all towards the axis of the machine by curving the flexible tabs 27, whereby the curved-over ends 26 come out of the groove 28 and the locking piece 24 can then be pulled backwards to extract its splines 25 from the splines of the stub shaft 13 and to disengage its teeth 30 from the teeth 31.

It would then seem possible to unscrew the nut 21 using a tool engaged between the teeth 31, but such an operation is actually premature because a low-pressure compressor shaft 34, also belonging to the run of low-pressure shafts 11, has remained in place and extends just in front of the nut 21: the axial space denoted I which separates them is smaller than the length, denoted J, by which the nut 21 is engaged on the stub shaft 13. It is therefore necessary also to remove the low-pressure compressor 4 and its shaft 34 before the high-pressure compressor 5 can be removed, this being an operation which is not necessarily useful. What is more, removing the low-pressure compressor 4 itself may be complicated and need to be preceded by the removal of other parts of the machine, for example a gearbox which has not been depicted in the figures. All of this means that removing the high-pressure compressor 5 is a lengthy and tiresome operation that cannot be made any easier by enlarging the space I, as this would entail reviewing the entire design of the machine and would increase its size.

DISCLOSURE OF THE INVENTION

The object of the invention therefore consists in facilitating the removal of such an arrangement for retaining a bearing comprising a stop, a clamping nut and a locking piece by reducing the preliminary manual interventions intended to free these parts, so that the bearing can be separated from the stub shaft it supports. The advantages of the invention are obvious with an arrangement of runs of shafts such as the one just described because there is no longer the need to remove parts in front of the front end of the stub shaft, and access to just one side of the retaining arrangement, from which the stub shaft will be removed, will suffice. To do this, a novel type of retaining arrangement is proposed. In its most general design, the arrangement, arranged around a stub shaft in which is machined a cavity and which is bounded by an end face, comprises a ring forming a stop for the bearing, a nut for clamping the ring and a piece for locking the nut, the locking piece being held in the cavity of the stub shaft by removable means of attachment and connected to the nut by imbricated teeth arranged in a circle on the nut and on the locking piece, and it is characterized in that the ring comprises an interior portion covering the end face of the stub shaft as far as the cavity and equipped with a screw thread for screwing onto a thread of the nut, and the nut is placed in the cavity and comprises a stop face directed towards the end face and engaged against a stop face standing up from the stub shaft in the cavity.

Further light will be shed on the nature of this new arrangement and on its advantages using the following figures, in addition to FIGS. 1 and 2 already described and which depict a turbomachine and that portion thereof which bears a conventional retaining arrangement.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

BEST MODES FOR CARRYING OUT THE INVENTION

Figure 1:
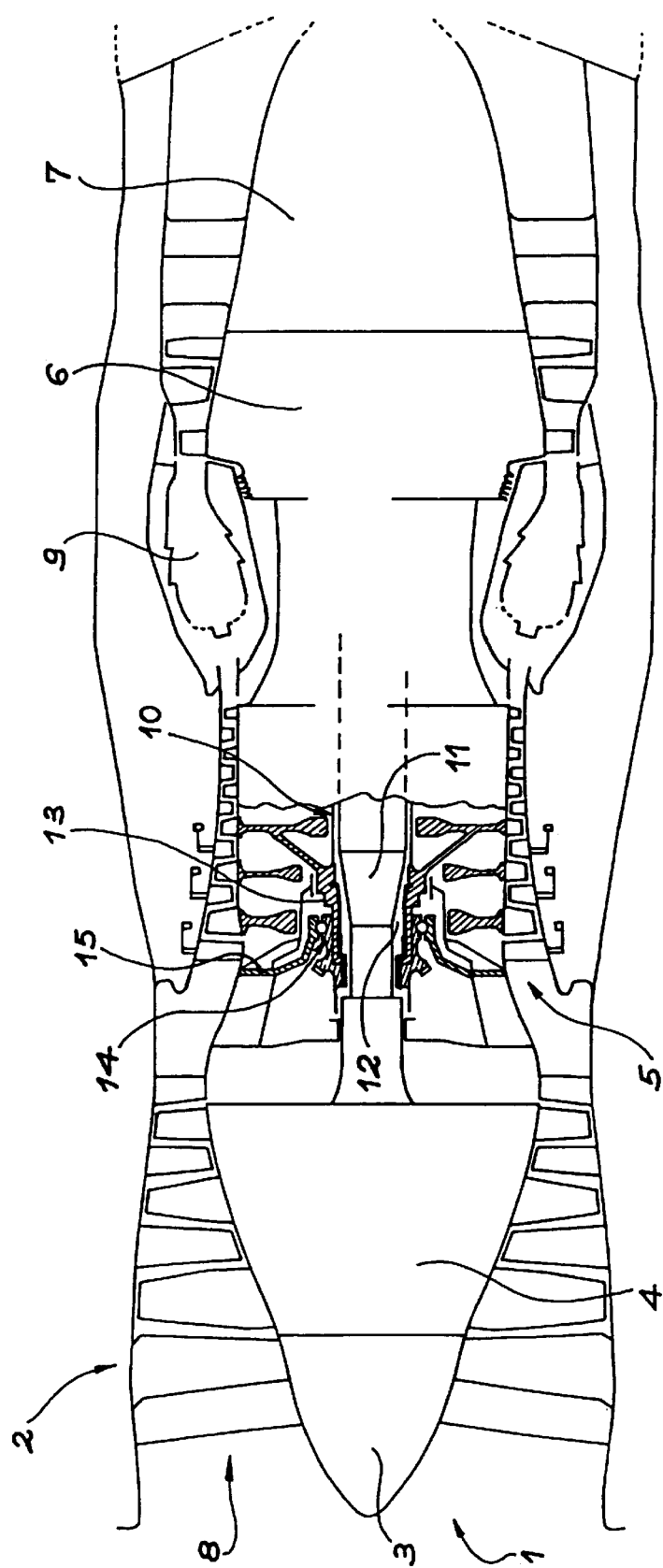
FIG. 1 shows a conventional aircraft engine.
Figure 2:
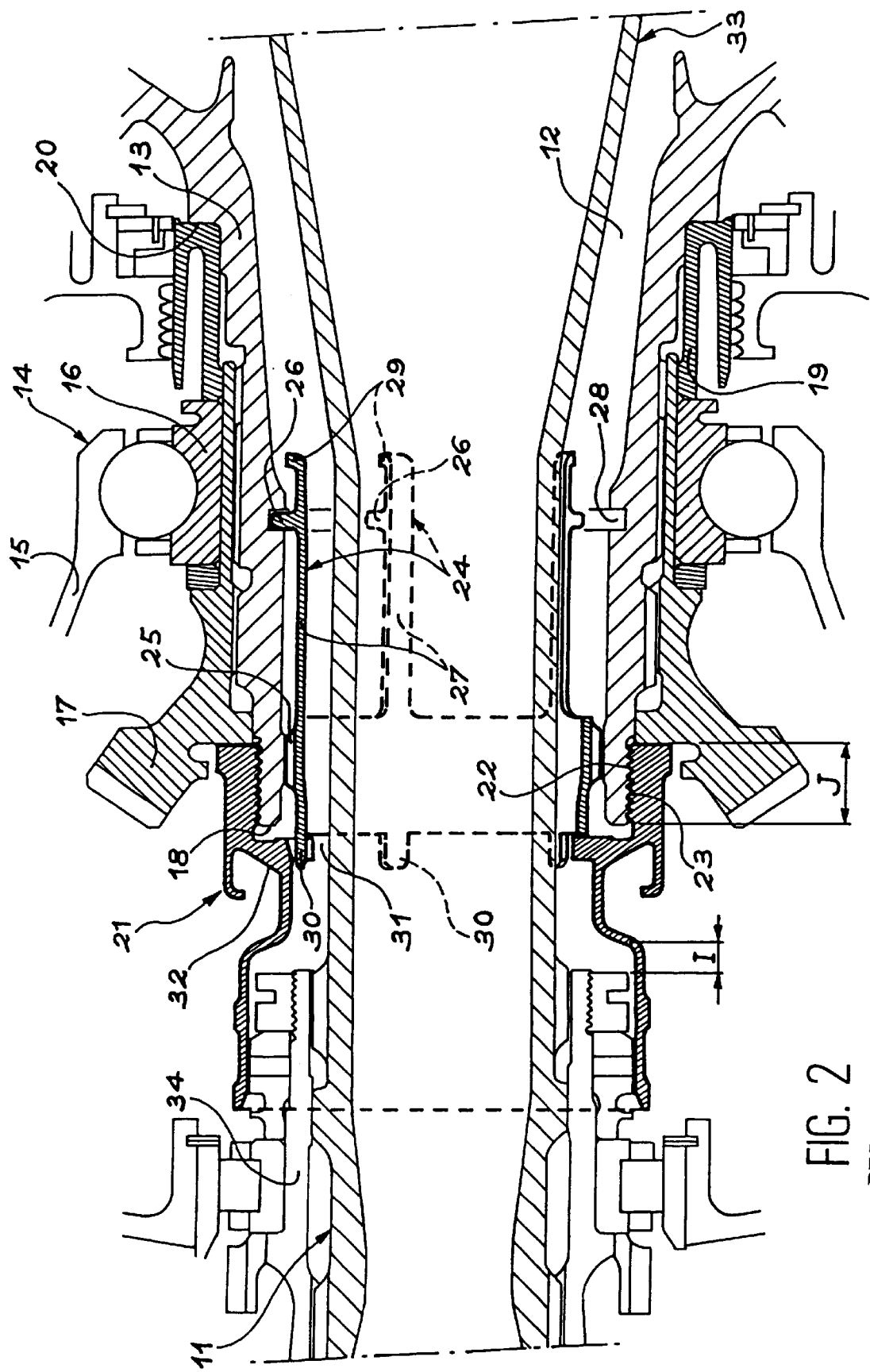
FIG. 2 shows additional details of the engine shown in FIG. 1.
Figure 3:
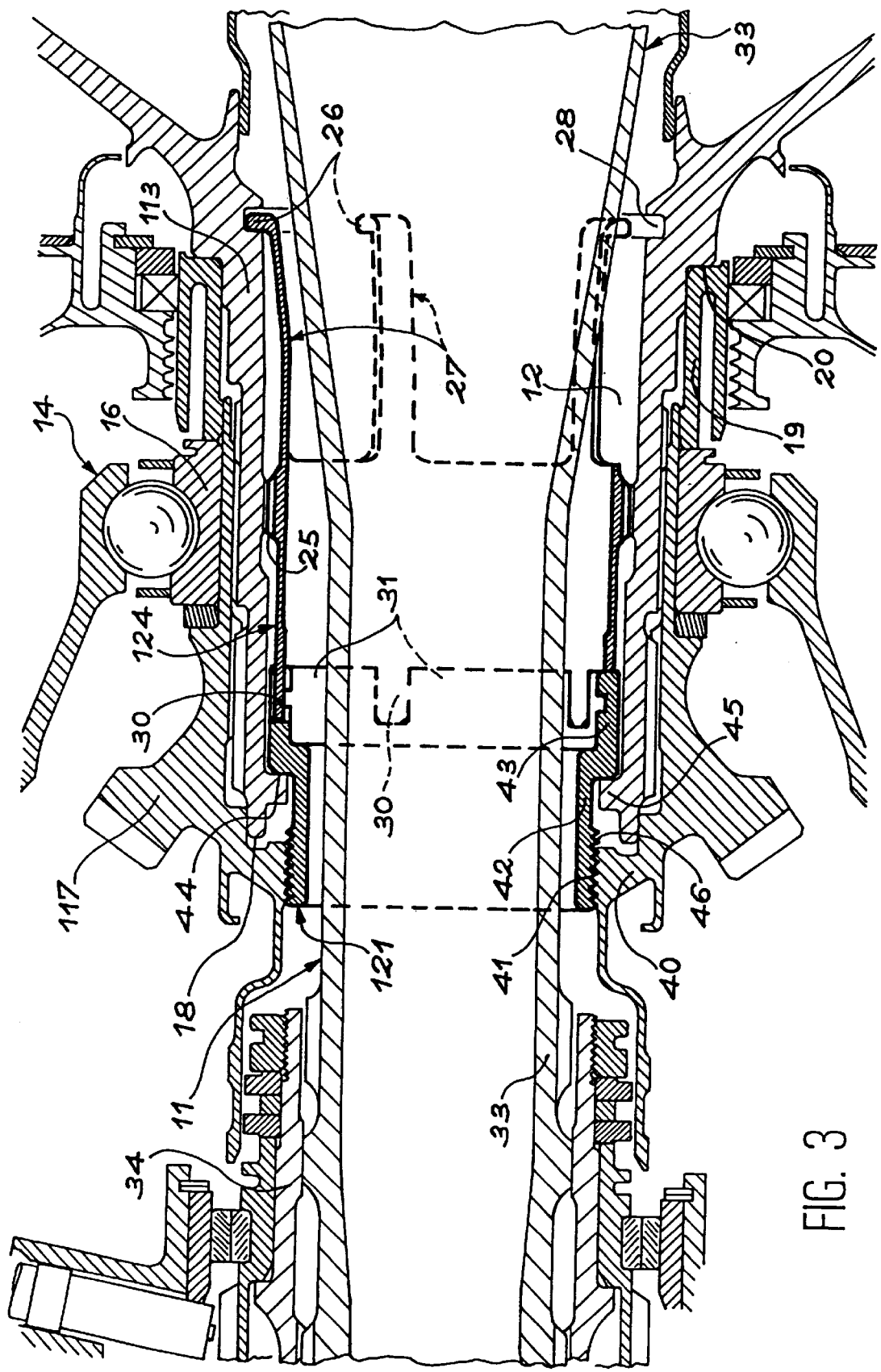
FIG. 3 is similar to FIG. 2 but illustrates the inventive arrangement of the present invention.
Figure 4:
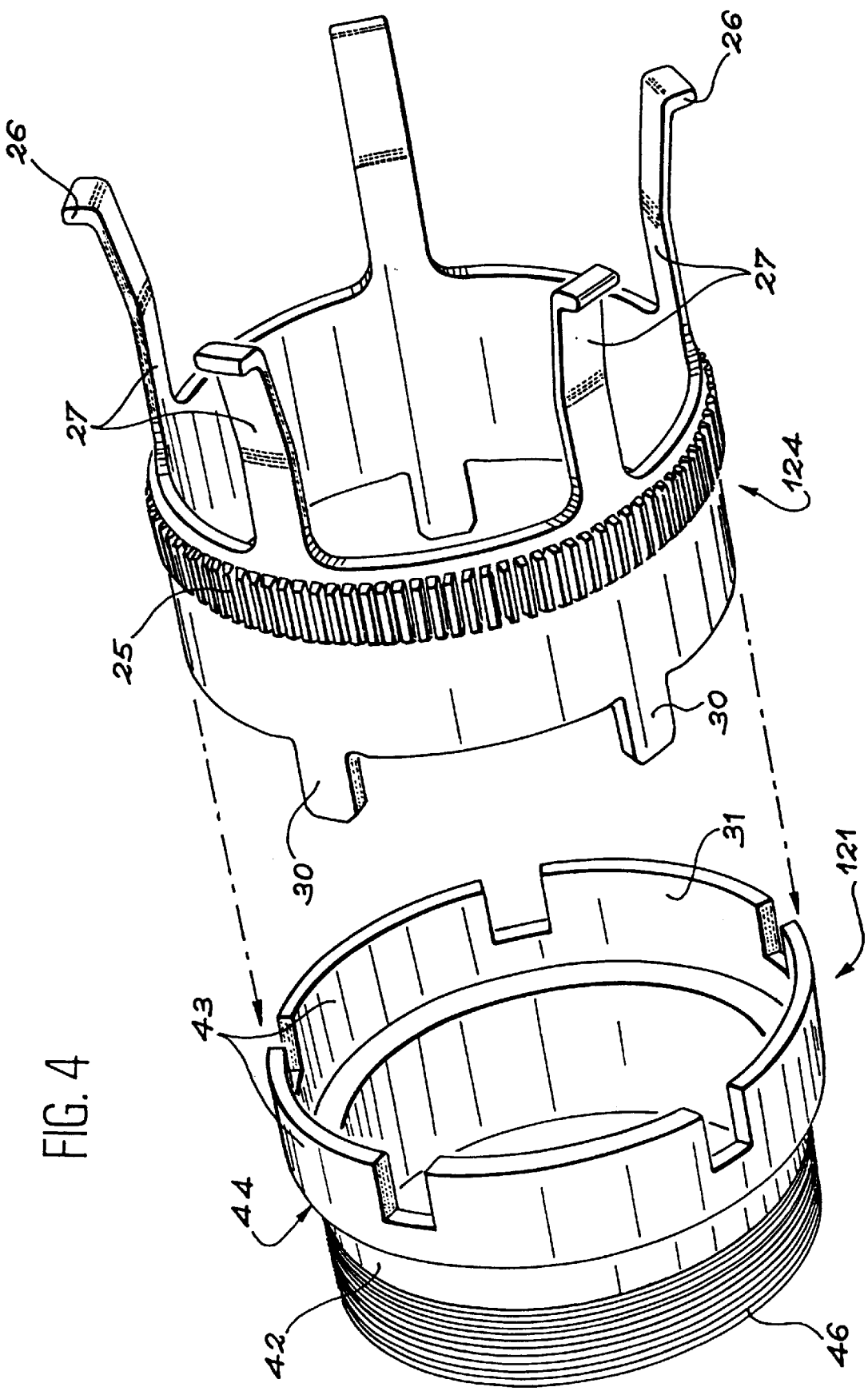
FIG. 4 is a perspective view of the novel nut and of its locking piece.

Several of the elements of FIG. 2 are found again in FIG. 3, particularly those bearing the numbers 11, 12, 14, 15, 16, 18, 19, 20, 33 and 34, such that a repeat description thereof will not be given. There is also a high-pressure compressor stub shaft and a locking piece, but these pieces here are referenced as 113 and 124 because they differ in a number of ways with respect to appearance and proportions by comparison with the corresponding parts 13 and 14 of the known design; further, the retaining arrangement also comprises a stop ring 117 and a nut 121, but which are fairly different from the corresponding parts 17 and 21 already described. Specifically, the stop ring 117 extends beyond the stub shaft 113 and has a portion 40 covering the end face 18 of the stub shaft 113 and extending as far as in front of the cavity 12, like the portion 32 of the nut 21, and which like it has a screw thread 41 on its internal face; the nut 121 is pushed back into the cavity 12, and on it can be seen an outer part 42 and an inner part 43, in the continuation along the axis of the machine, and both cylindrical, the outer part 42 being more slender than and separated from the other by a collar 44 acting as a stop face (facing forward) and which touches a corresponding stop collar 45 produced on the stub shaft 113 in the cavity 12 not far from the end face 18. The outer part 42 extends forward until it projects from the stub shaft j 113, and its end has a screw thread 46 engaged in the thread 41 of the stop ring 117, and the inner part 43 at its rear end bears a circle of teeth 31 analogous or similar to those already described and which mesh with the teeth 30 of the locking piece 124.

It can be seen that removing the high-pressure compressor will be far swifter because all that will be required will be for the high-pressure turbine 7 and its shaft 33 to be removed, followed by the locking piece 124, gripping it by the flexible tabs 27, in order to be able to unscrew the nut 121 which will also be extracted from the rear of the machine. The high pressure compressor 5 and its stub shaft 113 may then be removed by a backward movement, leaving the stop ring 117 in place against the bearing 14. Reassembly will be done by the reverse operations.

Figure 5:
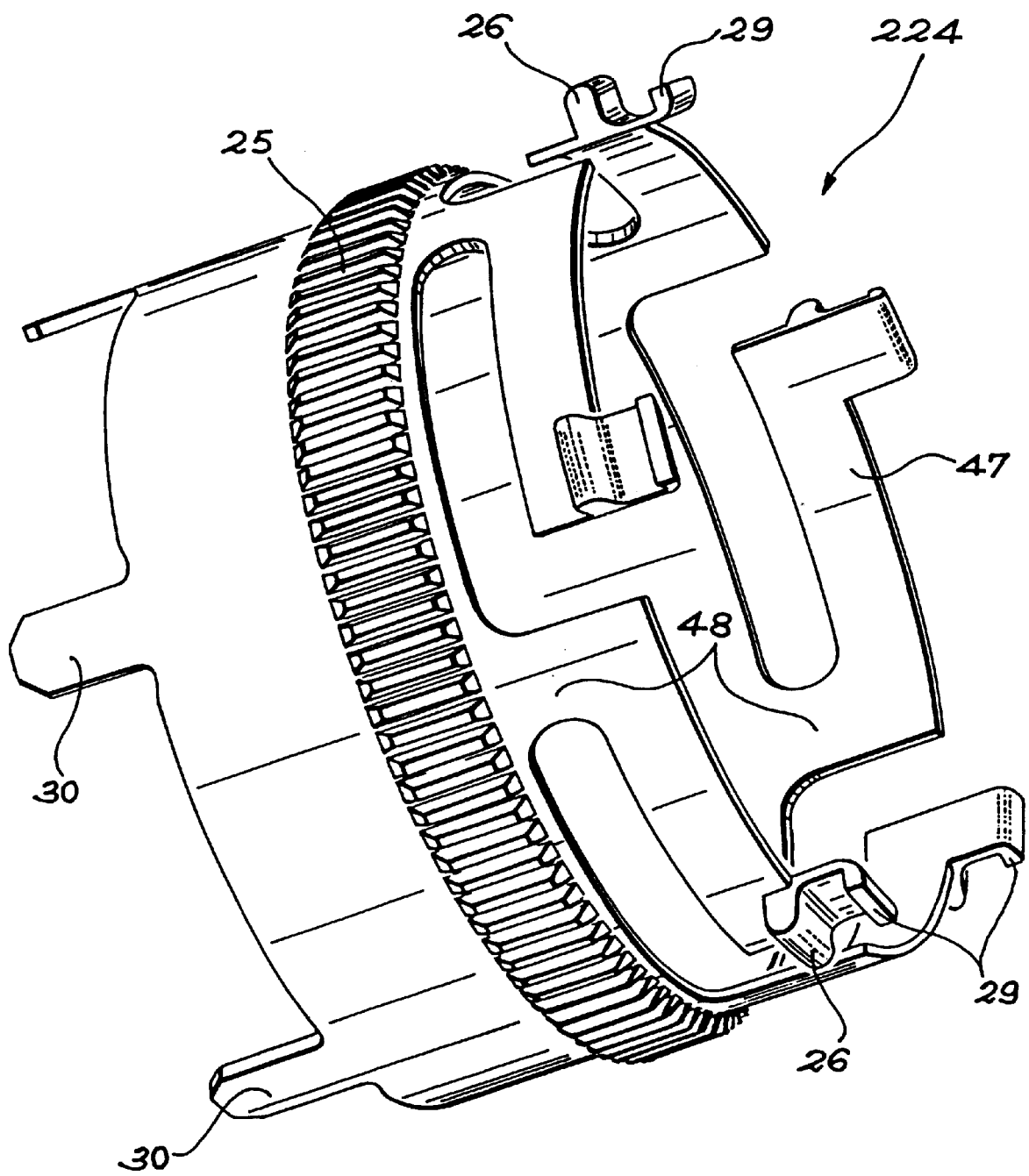
FIG. 5 illustrates a new locking piece which can be used in place of the previous ones.

There is no restriction dictating the use of locking parts analogous to the known part 24: one example of a substitute locking part bears the reference 224 in FIG. 5; it can be distinguished from a the previous ones in that the flexible tabs 27 extending axially are replaced by tabs 47 in the shape of an arc of a circle and which are consecutive along a circumference. Here again, all that is required is for the free ends of these tabs 47 to be pressed in order to cause the bent-over end 26 they bear to leave the groove 28 in the stub shaft 13 or 113. Once again, engagement tongues 29 similar to those of the part 24 and which could, incidentally, have also been added to the part 124, have been depicted. Axially extending bridges 48 connect the tabs 47 to the rest of the locking piece 224, at the opposite end to the curved-over ends 26.

What is claimed is:

1. Arrangement for retaining a bearing arranged around a stub shaft in which is machined a cavity and which is bounded by an end face comprising a ring forming a stop for the bearing, which comprises:

a nut for clamping the ring and a locking piece for locking the nut, the locking piece being held in the cavity of the stub shaft by removable means of attachment and connected to the nut by imbricated teeth arranged in a circle on the nut and on the locking piece, wherein the ring comprises an interior portion covering the end face of the stub shaft as far as the cavity and equipped with a screw thread for screwing onto a thread of the nut, and wherein the nut is positioned in the cavity and comprises a stop face directed towards the end face and engaged against a stop face standing up from the stub shaft in the cavity.

2. An arrangement for retaining a bearing according to claim 1, wherein the nut comprises a slender outer part and a thick inner part which are separated by a collar constituting the stop face, the outer part bearing the screw thread and the inner part bearing the circle of teeth.

3. An arrangement for retaining a bearing according to one of claims 1 or 2, wherein the attachment means comprise flexible tabs with curved-over ends on the locking piece, said tabs being at the opposite end to the circle of teeth, and a groove for housing the curved over ends being machined in the cavity.

4. An arrangement for retaining a bearing according to claim 3, which comprises tool engagement tongues arranged on the flexible tabs, in proximity with the curved-over ends.

5. An arrangement for retaining a bearing according to claim 3, wherein the flexible tabs are axial.

6. An arrangement for retaining a bearing according to claim 3, wherein the flexible tabs form an arc and are arranged consecutively on a circle.

7. An arrangement for retaining a bearing according to claim 1, wherein the arrangement is adopted for use in a turbomachine, the stop shaft being secured to a high-pressure compressor and an end face thereof faces towards a low-pressure compressor, the bearing supporting the stub shaft by way of a casing.

* * * * *